United States Patent [19]
Ewen et al.

[11] Patent Number: 5,883,202
[45] Date of Patent: Mar. 16, 1999

[54] PROCESS FOR OLEFIN POLYMERIZATION USING METALLOCENE CATALYSTS WITH LEWIS ACIDS AND ALUMINUM ALKYLS

[75] Inventors: John A. Ewen, Houston; Michael J. Elder, Friendswood, both of Tex.

[73] Assignee: Fina Technology, Inc., Dallas, Tex.

[21] Appl. No.: 476,953

[22] Filed: Jun. 7, 1995

(Under 37 CFR 1.47)

Related U.S. Application Data

[60] Division of Ser. No. 40,048, Mar. 30, 1993, Pat. No. 5,561,092, which is a continuation-in-part of Ser. No. 419,057, Oct. 10, 1989, abandoned.

[51] Int. Cl.$^6$ .................................................. C08F 2/02
[52] U.S. Cl. ................ 526/124.2; 526/132; 526/133; 526/134; 526/160; 526/901; 526/943; 526/351; 502/117; 502/152
[58] Field of Search ................................... 526/132, 133, 526/134, 160, 124.2

[56] References Cited

U.S. PATENT DOCUMENTS

| | | | |
|---|---|---|---|
| 3,242,099 | 3/1966 | Manyik et al. | 502/117 |
| 3,709,853 | 1/1973 | Karapinka | 526/130 |
| 3,756,998 | 9/1993 | Karapinka | 576/130 |
| 4,808,561 | 2/1989 | Welborn, Jr. | 502/104 |
| 5,155,080 | 10/1992 | Elder et al. | 502/152 |

FOREIGN PATENT DOCUMENTS

| | | |
|---|---|---|
| 0277003 | 8/1988 | European Pat. Off. . |
| 0277004 | 8/1988 | European Pat. Off. . |

OTHER PUBLICATIONS

X. Yang et al. (1991) J Am Chem Soc 113, pp. 3623–3625.

*Primary Examiner*—David W. Wu
*Attorney, Agent, or Firm*—Jim Wheelington; M. Norwood Cheairs

[57] ABSTRACT

The invention is a process for using a metallocene catalyst system in polymerization of olefins. The metallocene is contacted with the Lewis acid. The aluminum alkyl is contacted with the olefin. The two mixtures are contacted with each other under polymerization conditions.

33 Claims, No Drawings

PROCESS FOR OLEFIN POLYMERIZATION USING METALLOCENE CATALYSTS WITH LEWIS ACIDS AND ALUMINUM ALKYLS

This is a Divisional application of application Ser. No. 08/040,048, filed on Mar. 30, 1993, now U.S. Pat. No. 5,561,092 which is a continuation-in-part of application Ser. No. 07/419,057, filed on Oct. 10, 1989, now abandoned.

BACKGROUND

1. Field of the Invention

This invention relates, in general, to an improved catalyst system and a process for using the improved catalyst system and, specifically, to a catalyst system of a metallocene compound with a Lewis acid and an aluminum alkyl and a process for using the improved catalyst system for polymerization of olefins.

2. Description Of Related Art

The use of metallocene compounds as catalysts for the polymerization of olefins is known. German patent application No. 2,608,863 discloses a catalyst system for the polymerization of ethyl consisting of bis(cyclopentadienyl) titanium dialkyl, an aluminum trialkyl and water. German patent application No. 2,608,933 discloses an ethylene polymerization catalyst system consisting of zirconium metallocenes of he general formula $(cyclopentadienyl)_n ZrY_{4-n}$, wherein Y represents $R_1CH_2AlR_2$, $CH_2CH_2AlR_2$ and $CH_2CH(AlR_2)_2$ where R stands for an alkyl or metalloalkyl, and n is a number within the range 1–4; and the metallocene catalyst is used in combination with an aluminum trialkyl cocatalyst and water.

The use of metallocenes as catalysts in the copolymerization of ethylene and other alpha-olefins is also known in the art. U.S. Pat. No. 4,542,199 to Kaminsky et al. discloses a process for the polymerization of olefins and particularly for the preparation of polyethylene and copolymers of polyethylene and other alpha-olefins. The disclosed catalyst system includes a catalyst system of the formula $(cyclopentadienyl)_2 MERHal$ in which R is a halogen, a cyclopentadienyl or a $C_1-C_6$ alkyl radical, Me is a transition metal, in particular zirconium, and Hal is a halogen, in particular chlorine. The catalyst system also includes an alumoxane having the general formula $Al_2OR_4(Al(R)-O)_n$ for a linear molecule and/or $(Al(R)-O)_{n+2}$ for a cyclic molecule in which N is a number for 4–20 and R is a methyl or ethyl radical. A similar catalyst system is disclosed in U.S. Pat. No. 4,404,344.

U.S. Pat. No. 4,530,914 discloses a catalyst system for the polymerization of ethylene to polyethylene having a broad molecular weight distribution and especially a bimodal or multimodal molecular weight distribution. The catalyst system is comprised of at least two different metallocenes and an alumoxane. The patent discloses metallocenes that may have a bridge between two cyclopentadienyl rings with the bridge serving to make those rings stereorigid.

European Patent Publication No. 0185918 discloses a stereorigid, chiral zirconium metallocene catalyst for the polymerization of olefins. The application does not indicate that hafnium could be substituted for the zirconium and used to produce a useful polymer product. The bridge between the cyclopentadienyl groups is disclosed as being a linear hydrocarbon with 1–4 carbon atoms or a cyclical Hydrocarbon with 3–6 carbon atoms.

Polymerization of olefins is primarily with Ziegler-Natta catalysts. One family of Ziegler-Natta catalysts is Group IV metallocene compounds with methylaluminoxane (MAO) as a cocatalyst. A system for the production of isotactic polypropylene using a titanium or zirconium metallocene catalyst and an alumoxane cocatalyst is described in "Mechanisms of Stereochemical Control in Propylene Polymerization with Soluble Group 4B Metallocene/Methylalumoxane Catalysts," J. Am. Chem. Soc., Vol. 106, pp. 6355–64, 1984. The article shows that chiral catalysts derived from the racemic enantiomers of ethylene-bridged indenyl derivatives form isotactic polypropylene by the conventional structure predicted by an enantiomorphic-site stereochemical control model. The meso achiral form of the ethylene-bridged titanium indenyl diastereomers and achiral zirconocene derivatives, however, produce polypropylene with a purely atactic structure.

MAO activates the metallocene which then becomes able to promote polymerization of alpha-olefins. Other organometallic compounds of aluminum, such as trimethyl aluminum (TMA) or dimethyl aluminum halide, are known not to promote polymerization by themselves. Neither aluminum alkyls nor dimethylaluminum halides alone are active cocatalysts.

A combination of TMA and dimethylaluminum fluoride (DMF) has been shown to be effective as a cocatalyst in place of MAO. DMF is a Lewis acid. Such a combination is reported in "Isotactic Polymerization of Propene: Homogeneous Catalysts Based on Group 4 Metallocenes without Methylalumoxane", A. Zambelli, P. Longo and A. Grassi, Macromolecules, Vol. 22, p. 2186–2189, 1989. The stereochemical structure of the polymers prepared with TMA/DMF and with MAO were very similar. However, the polymerization yields obtained for TMA/DMF mixtures were substantially lower than those obtained for MAO.

It has also been reported that a metallocene compound with magnesium chloride forms a catalyst system with bis(cyclopentadienyl)thorium dimethyl which is effective to polymerize ethylene. Such a combination is reported in "$[(CH_2)C_5]_2 Th(CH_3)_2$ Surface Chemistry and Catalysis. Direct NMR Spectroscopic Observation of Surface Alkylation and Ethylene Insertion/Polymerization on $MgCl_2$", D. Heddin and T. J. Marks, J. Am. Chem. Soc., Vol. 110, No.5, 1988. A methyl group is abstracted from the cyclopentadienyl compound and a cation is formed. The methyl group coordinates with the magnesium anion. Magnesium chloride is a Lewis acid.

Metallocene catalysts are sensitive to poisons in the absence of a scavenging agent, such as methylaluminoxane. Polymerization requires high concentrations of the cations and frequently end up as either runaway reactions or yield no polymer at all.

SUMMARY OF THE INVENTION

In accordance with the present invention, there is provided a catalyst system of a metallocene compound with a Lewis acid and an aluminum alkyl and a process for using the improved catalyst system for polymerization of olefins. Homopolymers or copolymers produced by the polymerization of alpha olefins may be produced in accordance with the present invention. Propagation of the polymer chain is carried out in the presence of a neutral alkyl derivative of a metallocene compound which has been put into contact with a Lewis acid and an aluminum alkyl. Any metallocene catalyst compound having two cyclopentadienyl rings, substituted or unsubstituted, attached to a transition metal which can be ionized by a Lewis acid would be useful in this invention.

The metallocene is contacted with the Lewis acid. The aluminum alkyl is contacted with the olefin. The two mixtures are contacted with each other under polymerization conditions.

DESCRIPTION OF THE INVENTION

This invention is for a catalyst system comprising a neutral metallocene compound, a Lewis acid and an aluminum alkyl and a process for using the catalyst system for polymerization of olefins.

The neutral metallocene compound is of the general formula:

$$R''_n(CpR_4)(CpR'_4)MeQ_p$$

wherein $(CpR_4)$ and $(CpR'_4)$ are a cyclopentadienyl or substituted cyclopentadienyl, $(CpR_4)$ and $(CpR'_4)$ being the same or different, R and R' are hydrogen or a hydrocarbyl radicals from 1–20 carbon atoms, R being the same or different, R' being the same or different, R" is a structural bridge between $(CpR_4)$ and $(CpR'_4)$ imparting stereorigidity to the metallocene, n is 0 or 1 designating whether the bridge is not present or is present, Me is a Group IIIB, IVB, VB or VIB metal, Q is a hydride, a halogen, amide or a hydrocarbyl radical, each Q being the same or different, except only one Q can be a hydride and p is the valence of Me minus two. R and R' may be selected such that the substituent on the cyclopentadienyl ring is an aromatic ring or cylic hydrocarbyl and $(CpR_4)$ and $(CpR'_4)$ are fused rings, e.g., indenyl or fluorenyl. Me is preferably a Group IVB metal, such as titanium, zirconium or hafnium and is most preferably zirconium. Q is preferably an alkyl, an aryl, an alkenyl, and alkylaryl or an arylalkyl having up to 20 carbon atoms. Q is most preferably an alkyl or alkoxy up to six carbon atoms or an aryl up to 10 carbon atoms. The neutral metallocene compound is preferably ethylenebis(indenyl)zirconium dimethyl or isopropylidene(cyclopentadienyl-1-fluorenyl) zirconium dimethyl and is most preferably ethylenebis (indenyl)zirconium dimethyl.

The Lewis acid useful in this invention is any material which can accept an electron pair and is of sufficient acidity to ionize a neutral metallocene to form a cationic metallocene catalyst. In addition, the ligands of he Lewis acid cannot be reactive with the metallocene cations. Preferably, the Lewis acid contains boron or is magnesium chloride $(MgCl_2)$. Most preferably, the Lewis acid is tris (pentafluorophenyl)boron.

The aluminum alkyl is of the general formula $AlR*_3$ where $R*$ is halogen, hydride, alkyl, alkoxy or aryl, each $R*$ being the same or different and al least one $R*$ is an alkyl. Preferably, the aluminum alkyl is trimethyl aluminum (TMA) or triethyl aluminum (TEAl). Most preferably, the aluminum alkyl is TEAl.

In the practice of this invention, the aluminum alkyl is mixed with the olefin. The Lewis acid is dissolved or slurried in a nonpolar solvent. The neutral metallocene catalyst is dissolved separately into the same solvent. The Lewis acid mixture and the catalyst mixture are combined. The mixture is placed in contact with the blend of olefin and aluminum alkyl. Molar ratios for metallocene:Lewis acid:aluminum alkyl range from 0.01:1:0.1 to 5:1:350 and are preferably from 0.5:1:0.5 to 4:1:25 and are most preferably 0.2:1:1 for Lewis acids which dissolve in a nonpolar solvent and 0.1:1:1 for Lewis acids which form a slurry in nonpolar solvents.

Polymerization of the olefin is accomplished by any of the known means for polymerization of olefins with metallocene catalysts, for example, polymerization in bulk, slurry or gas phase. For polypropylene, polymerization temperatures range from –80° C. to 150° C., preferably 25° C. to 90° C. and most preferably from 50° C. to 80° C.

The following catalyst system were evaluated with and without addition of an aluminum alkyl and with and without addition of a Lewis acid.

1. $iPr(Cp-1-Flu)ZrMe_2/F15/TEAl$ (TMA)
2. $iPr(Cp-1-Flu)ZrMe_2/MgCl_2/TEAl$
3. $Et(Ind)_2ZrMe_2/F-15/TEAl$
4. $Et(Ind)_2ZrMe_2/MgCl_2/TEAl$ $Et(Ind)_2ZrMe_2$ is ethylenebis(indenyl)zirconium dimethyl, $iPr(Cp-1-Flu)ZrMe_2$ is isopropylidene (cyclopentadienyl-1-fluorenyl)zirconium dimethyl and F15 is tris(pentafluorophenyl)boron.

A combination of aluminum alkyl and a Lewis acid was found to be necessary for reproducible, controllable, high efficiency polymerizations.

The invention having been generally described, the following examples are given as particular embodiments of the invention and to demonstrate the practice and advantages thereof. It is understood that the examples are given by way of illustration and are not intended to limit the specification or the claims to follow in any manner.

GROUP 1

EXAMPLE I 0.16 mmol of triethyl aluminum (TEAl) was dissolved in 5 ml of toluene solvent and added to a Zipperclave reactor under 5 psig of nitrogen. Reactor temperature was set to 70° C. and one liter of propylene was pumped into the reactor. The mixture was stirred for ten minutes at 1200 rpm.

35 mg of $iPr(Cp-1-Flu)ZrMe_2$ was dissolved in 10 ml of toluene. The catalyst was added to a 40 ml stainless steel bomb equipped with ball valves on each end. 400 ml of propylene was pumped through the bomb into the reactor. The reactor temperature remained at 70° C. and the contents of the reactor were agitated for thirty minutes. At the end of the polymerization, the reactor was cooled and the unreacted propylene was vented from the reactor. There was no reaction product. The results are shown in Table I.

EXAMPLE II 0.33 mmol of triethylaluminum (TEAl) was dissolved in 5 ml of toluene and added to a Zipperclave reactor. Reactor temperature was set to 70° C. and 1.0 liter of propylene was added to the reactor. The mixture was stirred for 15 minutes at 1200 rpm.

78.6 mg of tris(pentafluorophenyl) boron was dissolved in 5 cc of toluene to form a colorless solution. 60 mg of $iPr(Cp-1-Flu)ZrMe_2$ was dissolved in 10 cc of toluene to form a yellow solution. The two solutions were mixed together and formed a red solution which was mixed for 5 minutes at room temperature.

The catalyst mixture was added to a 50 ml stainless steel bomb. 200 ml of propylene was pumped through the bomb into the reactor. The contents of the reactor were agitated for thirty minutes. The reactor temperature was increased to 90° C. Unreacted propylene was vented from the reactor and the reaction product was washed with acetone and dried in a vacuum.

The polymer was analyzed for melting point and molecular weight. The melting point was derived from differential scanning calorimetry (DCS). The molecular weight was calculated using gel permeation chromatography (GPC) analysis. The results are shown in Table I.

EXAMPLE III

The procedure of Example II was repeated using 0.33 mmol of triethyl aluminum (TEAl), 27 mg of tris (pentafluorophenyl)boron and 20 mg of iPr(Cp-1-Flu)ZrMe$_2$. The contents of the reactor were agitated for thirty minutes. The results are shown in Table I.

EXAMPLE IV

The procedure of Example II was repeated using 0.16 mmol of triethyl aluminum (TEAl), 46 mg of tris (pentafluorophenyl)boron and 15 mg of iPr(Cp-1-Flu)ZrMe$_2$. The contents of the reactor were agitated for thirty minutes. The results are shown in Table I.

EXAMPLE V

The procedure of Example II was repeated using 0.10 mmol of triethyl aluminum (TEAl), 46 mg of tris (pentafluorophenyl)boron and 35 mg of iPr(Cp-1-Flu)ZrMe$_2$. The contents of the reactor were agitated for thirty minutes. The results are shown in Table I.

EXAMPLE VI

The procedure of Example II was repeated using 0.16 mmol of triethyl aluminum (TEAl), 46 mg of tris (pentafluorophenyl)boron and 35 mg of iPr(Cp-1-Flu)ZrMe$_2$. The contents of the reactor were agitated for thirty minutes. The results are shown in Table I.

EXAMPLE VII

The procedure of Example II was repeated using 0.33 mmol of triethyl aluminum (TEAl), 46 mg of tris (pentafluorophenyl)boron and 35 mg of iPr(Cp-1-Flu)ZrMe$_2$. The contents of the reactor were agitated for thirty minutes. The results are shown in Table I.

EXAMPLE VIII

The procedure of Example II was repeated using 0.16 mmol of trimethyl aluminum (TMA), 46 mg of tris (pentafluorophenyl)boron and 35 mg of iPr(Cp-1-Flu)ZrMe$_2$. The contents of the reactor were agitated for thirty minutes. The results are shown in Table I.
GROUP 2

EXAMPLE IX 0.16 mmol of triethyl aluminum (TEAl) was dissolved in 5 ml of toluene and added to a Zipperclave reactor under 5 psig nitrogen.

Reactor temperature was set to 60° C. and one liter of propylene was pumped into the reactor. The mixture was stirred for ten minutes at 1200 rpm.

86 mg of MgCl$_2$ was slurried in 5 cc of toluene. 18 mg of iPr(Cp-1-Flu)ZrMe$_2$ was cannulated into the MgCl$_2$ slurry. The mixture were stirred for 12 hours to give a dark purple suspension.

The catalyst mixture was added to a 50 ml stainless steel bomb. 200 ml of propylene was pumped through the bomb into the reactor. The contents of the reactor were agitated for thirty minutes. Unreacted propylene was vented from the reactor and the reaction product was washed with acetone and dried in a vacuum oven.

The polymer was analyzed for melting point and molecular weight. The melting point was derived from differential scanning calorimetry (DCS). The molecular weight was calculated using gel permeation chromatography (GPC) analysis. The results are shown in Table I.
GROUP 3

EXAMPLE X

One liter of propylene was added to the Zipperclave reactor. Reactor temperature was set to 70° C. 78.6 mg of tris(pentafluorophenyl)boron was dissolved in 5 cc of toluene. 58 mg of Et(Ind)$_2$ZrMe$_2$ was dissolved in 18 cc of toluene. The two solutions were mixed together for 5 minutes at room temperature.

The catalyst mixture was added to a 50 ml stainless steel bomb. 200 ml of propylene was pumped through the bomb into the reactor. The reactor temperature was maintained at 70° C. and the contents of the reactor were agitated for 35 minutes. Unreacted propylene was vented from the reactor. There was no reaction product. The results are shown in Table I.

EXAMPLE XI 0.33 mmol of triethyl aluminum (TEAl) was dissolved in 5 ml of toluene and added to a Zipperclave reactor. Reactor set point temperature was set to 70° C. and one liter of propylene was added to the reactor. The mixture was stirred form ten minutes at 1200 rpm.

78.6 mg of tris(pentafluorophenyl)boron was dissolved in 5 cc of toluene to form a colorless solution. 58 mg of Et(Ind)$_2$ZrMe$_2$ was dissolved in 10 cc of toluene to form a pale yellow solution which was mixed for 5 minutes at room temperature.

The catalyst mixture was added to a 50 ml stainless steel bomb. 200 ml of propylene was pumped through the bomb into the reactor. The reactor temperature increased to over 95° C. and the contents of the reactor were agitated for six minutes. Unreacted propylene was vented from the reactor and the reaction product was washed with acetone and dried in a vacuum oven.

The polypropylene reaction product was analyzed for melting point and molecular weight. The melting point was derived from differential scanning calorimetry (DSC). The molecular weight was calculated using gel permeation chromatography (GPC) analysis. The results are shown in Table I.

EXAMPLE XII

The procedure of Example XI was repeated using 0.66 mmol of triethyl aluminum (TEAl), 27 mg of tris (pentafluorophenyl)boron and 20 mg of Et(Ind)$_2$ZrMe$_2$. The contents of the reactor were agitated for 22 minutes. The results are shown in Table I.

EXAMPLE XIII

The procedure of Example XI was repeated using 0.33 mmol of triethyl aluminum (TEAl), 2.5 mg of tris (pentafluorophenyl)boron and 2.5 mg of Et(Ind)$_2$ZrMe$_2$. The contents of the reactor were agitated for thirty minutes. The results are shown in Table I.

EXAMPLE XIV

The procedure of Example XI was repeated using 0.66 mmol of triethyl aluminum (TEAl), 102 mg of tris (pentafluorophenyl)boron and 2.5 mg of $Et(Ind)_2ZrMe_2$. The contents of the reactor were agitated for thirty minutes. The results are shown in Table I.

EXAMPLE XV

The procedure of Example XI was repeated using 0.66 mmol of triethyl aluminum (TEAl), 154 mg of tris (pentafluorophenyl)boron and 2.5 mg of Et(Ind)2ZrMe$_2$. The contents of the reactor were agitated for thirty minutes. The results are shown in Table I.

EXAMPLE XVI

The procedure of Example XI was repeated using 0.66 mmol of triethyl aluminum (TEAl), 308 mg of tris (pentafluorophenyl)boron and 2.5 mg of $Et(Ind)_2ZrMe_2$. The contents of the reactor were agitated for thirty minutes. The results are shown in Table I.

GROUP 4

EXAMPLE XVII

The procedure of Example IX was repeated with 352 mg of magnesium chloride ($MgCl_2$), 40 mg of $Et(Ind)_2ZrMe_2$, 0.66 mmol of triethyl aluminum (TEAl) and a run time of thirty minutes. The results are shown in Table I.

EXAMPLE XVIII

The procedure of Example IX was repeated with 352 mg of magnesium chloride ($MgCl_2$), 10 mg of $Et(Ind)_2ZrMe_2$, 0.66 mmol of triethyl aluminum (TEAl) and a run time of thirty minutes. The results are shown in Table I.

EXAMPLE XIX

The procedure of Example IX was repeated with 124 mg of magnesium chloride ($MgCl_2$), 40 mg of $Et(Ind)_2ZrMe_2$, 0.66 mmol of triethyl aluminum (TEAl) and a run time of thirty minutes. The results are shown in Table I.

For the F15 catalyst system, higher efficiencies were obtained by increasing the B:Zr molar ratio significantly above 1:1. This implies that the lower efficiencies are partly due to incomplete ionization by F15.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letter of Patent of the United States of America is:

1. A process for polymerization of propylene comprising:
   a) mixing an aluminum alkyl wherein the aluminum alkyl is of the general formula $AlR^*3$ where $R^*$ is a halogen, hydride, alkyl or aryl, each $R^*$ being the same of different and at least one $R^*$ is an alkyl with propylene;
   b) mixing a neutral metallocene compound wherein the neutral metallocene compound is of the general formula:

$$R''_n(CpR_4)(CpR'_4)MeQ_p$$

wherein $(CpR_4)$ and $(CpR'_4)$ are a cyclopentadienyl or substituted cyclopentadienyl, $(CpR_4)$ and $(CpR'_4)$ being the same or different, R and R' are hydrogen or a hydrocarbyl radicals from 1–20 carbon atoms, R being the same or different, R' being the same or different, R" is a structural bridge between $(CpR_4)$ and $(CpR'_4)$ imparting stereorigidity to the metallocene, n is 1 designating that the bridge is present, Me is a Group IIIB, IVB, VB or VIB metal, Q is a hydride, a halogen, amide or a hydrocarbyl radical, each Q being the same or different, except only one Q can be a hydride and p is the valence of Me minus two with magnesium chloride;
   c) mixing the metallocene-magnesium chloride mixture with the aluminum alkyl-propylene mixture.

2. A process as recited in claim 1 wherein Q is an alkyl of up to six carbons or an aryl of up to 10 carbons.

3. A process as recited in claim 1 wherein the molar ratio for metallocene:magnesium chloride:aluminum alkyl ranges from 0.01:1:0.1 to 5:1:350.

TABLE I

| Example | Catalyst μmol (mg) | Lewis Acid μmol (mg) | Aluminum Alkyl mmol | Run time min | Polymerization temp. (°C.) | Yield (grams) | Melt Temp (°C.) | MW × 1000 | MWD |
|---|---|---|---|---|---|---|---|---|---|
| iPr(Flu) | (Cp)ZrMe$_2$ | | TEA1 | | | | | | |
| 1 | 89.8 (35) | 0 | 0.16 | 30 | 70 | 0 | — | — | — |
| 2 | 153 (60) | 153 (78.6) | 0.33 | 30 | 70 | 123 | — | 57.6 | 1.9 |
| 3 | 51.2 (20) | 52.73 (27) | 0.33 | 30 | 70 | 7 | 110 | 64.3 | 2.0 |
| 4 | 38.4 (15) | 89.8 (46) | 0.16 | 30 | 70 | 58 | — | — | — |
| 5 | 89.5 (35) | 89.8 (46) | 0.10 | 30 | 70 | 5 | 105 | 39 | 2.0 |
| 6 | 89.5 (35) | 89.8 (46) | 0.16 | 30 | 70 | 168 | 105 | 61 | 1.9 |
| 7 | 89.5 (35) | 89.8 (46) | 0.33 | 30 | 70 | 110 | 123 | 55 | 2.0 |
| | | | TMA | | | | | | |
| 8 | 89.5 (35) | 89.8 (46) | 0.16 | 30 | 70 | 167 | — | — | — |
| | | MgCl$_2$ | TEA1 | | | | | | |
| 9 | 45 (18) | 900 (86) | 0.66 | 30 | 70 | 6 | 131 | 57 | 2.0 |
| Et(Ind)$_2$ZrMe$_2$ | | B(C$_6$F$_5$)$_3$ | | | | | | | |
| 10 | 154 (58) | 154 (78.6) | 0 | 35 | 70 | 0 | — | — | — |
| 11 | 154 (58) | 154 (78.6) | 0.33 | 6 | 70 | 117 | 113 | 15 | 4.2 |
| 12 | 53 (20) | 53 (27) | 0.66 | 22 | 70 | 70 | 122 | 17.5 | 3.5 |
| 13 | 6.6 (2.5) | 6.6 (2.5) | 0.33 | 30 | 70 | 0 | — | — | — |
| 14 | 6.6 (2.5) | 200 (102) | 0.66 | 30 | 70 | 1 | 127 | 26 | 2.8 |
| 15 | 6.6 (2.5) | 300 (154) | 0.66 | 30 | 70 | 90 | 130 | 20 | 5.1 |
| 16 | 6.6 (2.5) | 600 (308) | 0.66 | 30 | 70 | 33 | 129 | 25 | 3.7 |
| Et(Ind)$_2$ZrMe$_2$ | | MgCl$_2$ | | | | | | | |
| 17 | 1.06 (40) | 3700 (352) | 0.66 | 30 | 70 | 49 | 133 | 31 | 1.9 |
| 18 | 27 (10) | 3700 (352) | 0.66 | 30 | 70 | 47 | 130 | 29 | 2.4 |
| 19 | 106 (40) | 1300 (124) | 0.66 | 30 | 70 | 8 | 130 | 30 | 2.0 |

4. A process as recited in claim 3 wherein the molar ratio for metallocene:magnesium chloride:aluminum alkyl ranges from 0.5:1:0.5 to 4:1:25.

5. A process as recited in claim 4 wherein the molar ratio for metallocene:magnesium chloride:aluminum alkyl is 0.1:1:1.

6. A process as recited in claim 1 wherein the aluminum alkyl is selected from the group consisting of triethylaluminum and trimethylaluminum.

7. A process as recited in claim 6 wherein the aluminum alkyl is triethylaluminum.

8. The process as recited in claim 1 wherein Q is a hydrocarbyl radical having up to 20 carbon atoms selected from the group consisting of an alkyl, an aryl, an alkenyl, an alkylaryl and an arylalkyl.

9. The process as recited in claim 1 wherein the Me is a Group IVB metal selected from the group consisting of titanium, zirconium and hafnium.

10. A process as recited in claim 9 wherein Me is zirconium.

11. A process as recited in claim 1 wherein the polymerization is in bulk, slurry or gas phase.

12. A process as recited in claim 1 wherein the polymerization temperature is from −80 C. to 150° C.

13. A process as recited in claim 12 wherein the polymerization temperature is from 25° C. to 90° C.

14. A process as recited in claim 13 wherein the polymerization temperature is from 50° C. to 80° C.

15. A process for polymerization of propylene comprising:
  a) mixing an aluminum alkyl of the general formula $AlR^*_3$ where $R^*$ is a halogen, hydride, alkyl or aryl, each $R^*$ being the same of different and at least one $R^*$ is an alkyl with propylene;
  b) mixing a neutral metallocene compound selected from the group consisting of ethylenebis(indenyl)zirconium dimethyl and isopropylidene(cyclopentadienyl-1-fluorenyl)zirconium dimethyl with a Lewis acid of sufficient acidity to ionize the neutral metallocene compound to form a cationic metallocene catalyst wherein the Lewis acid has ligands which are not reactive with the metallocene cation and is selected from the group consisting of all Lewis acids containing boron and magnesium chloride; and
  c) mixing the metallocene-Lewis acid mixture with the aluminum propylene mixture.

16. A process as recited in claim 15 wherein the neutral metallocene compound is ethylenebis(indenyl)zirconium dimethyl.

17. A process as recited in claim 15 wherein the neutral metallocene compound is isopropylidene(cyclopentadienyl-1-fluorenyl)zirconium dimethyl.

18. A process as recited in claim 15 wherein the molar ratio for metallocene:Lewis acid:aluminum alkyl ranges from 0.01:1:0.1 to 5:1:350.

19. A process as recited in claim 18 wherein the molar ratio for metallocene:Lewis acid:aluminum alkyl ranges from 0.5:1:0.5 to 4:1:25.

20. A process as recited in claim 15 wherein the aluminum alkyl is selected from the group consisting of triethylaluminum and trimethylaluminum.

21. A process as recited in claim 20 wherein the aluminum alkyl is triethylaluminum.

22. A process as recited in claim 15 wherein the Lewis acid is one which dissolves in a nonpolar solvent.

23. A process as recited in claim 22 wherein the molar ratio for metallocene:Lewis acid:aluminum alkyl is 0.2:1:1.

24. A process as recited in claim 15 wherein the Lewis acid is one which forms a slurry in a nonpolar solvent.

25. A process as recited in claim 24 wherein the molar ratio of B:Zr is above 1:1.

26. A process as recited in claim 24 wherein the molar ratio for metallocene:Lewis acid:aluminum alkyl is 0.1:1:1.

27. A process as recited in claim 15 wherein the Lewis acid is chosen from the group consisting of tris(pentafluorophenyl)boron and magnesium chloride.

28. A process as recited in claim 27 wherein the Lewis acid is tris(pentafluorophenyl)boron.

29. A process as recited in claim 27 wherein the Lewis acid is magnesium chloride.

30. A process as recited in claim 15 wherein the polymerization is in bulk, slurry or gas phase.

31. A process as recited in claim 15 wherein the polymerization temperature is from −80° C. to 150° C.

32. A process as recited in claim 31 wherein the polymerization temperature is from 25° C. to 90° C.

33. A process as recited in claim 32 wherein the polymerization temperature is from 50° C. to 80° C.

* * * * *